(No Model.)
E. THOMSON.
SECURING METAL BANDS ON WOODEN OR OTHER ARTICLES.
No. 455,421. Patented July 7, 1891.
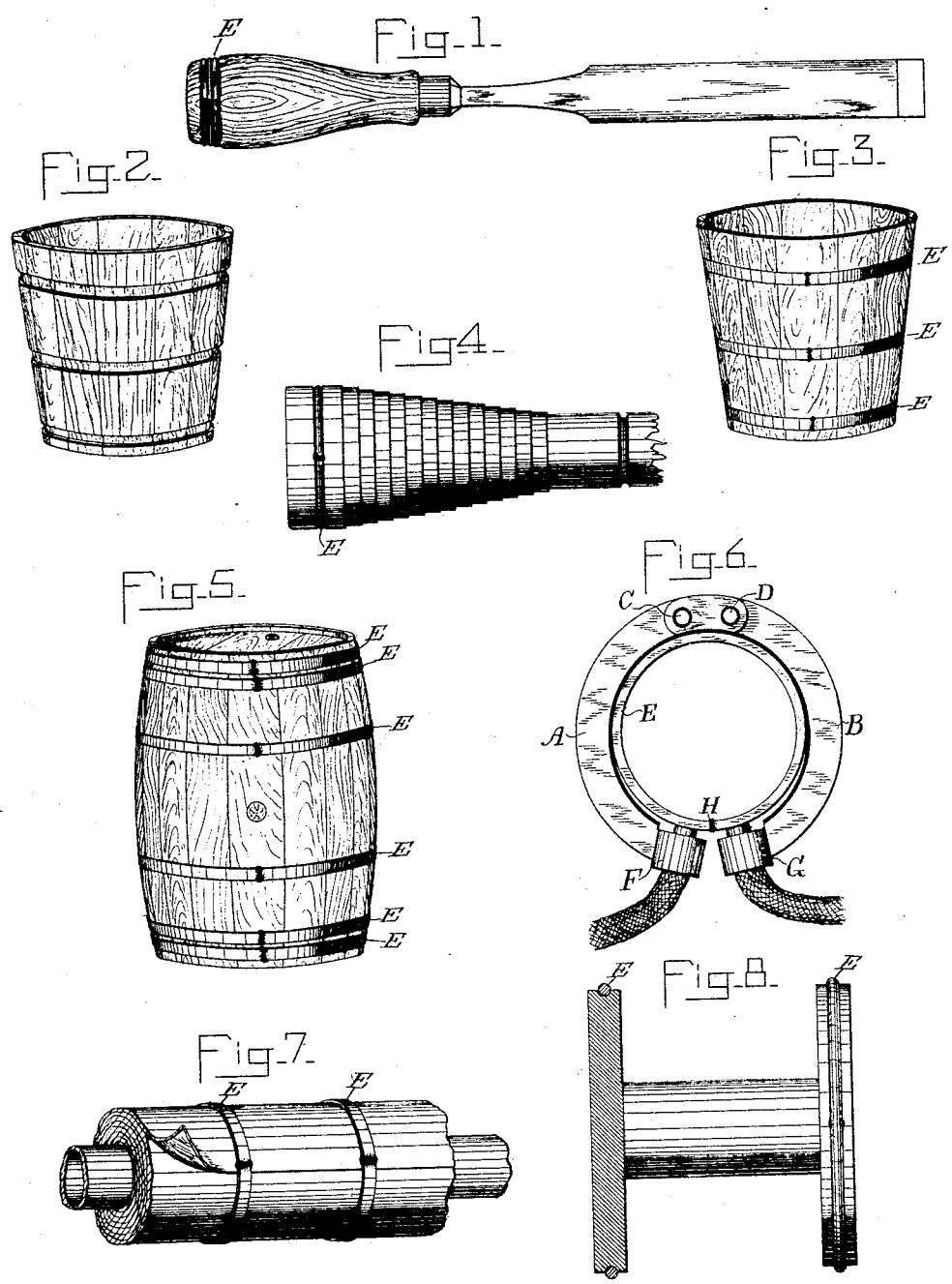

UNITED STATES PATENT OFFICE.

ELIHU THOMSON, OF SWAMPSCOTT, MASSACHUSETTS, ASSIGNOR TO THE THOMSON ELECTRIC WELDING COMPANY, OF MAINE.

SECURING METAL BANDS ON WOODEN OR OTHER ARTICLES.

SPECIFICATION forming part of Letters Patent No. 455,421, dated July 7, 1891.

Application filed February 24, 1891. Serial No. 382,352. (No model.)

*To all whom it may concern:*

Be it known that I, ELIHU THOMSON, a citizen of the United States, and a resident of Swampscott, in the State of Massachusetts, have invented certain new and useful Improvements in Securing Metal Bands on Wooden or other Articles, of which the following is a specification.

My invention relates to the manner of applying metal bands, hoops, rings, or similar devices to pails, kegs, barrels, tool-handles, or other objects. In applying metal hoops or bands to pails, kegs, and such articles the practice heretofore has been to weld the ends of the strip or band to form the ring and then to slip it onto the article complete.

My invention consists in applying the metal retaining ring or band and welding it after it is in place on the article or object.

In carrying out my invention I may utilize the electric-welding process by passing an electric current across the ends of the band or ring after the same has been applied over the object and the ends brought into contact with one another.

By my invention the retaining band, ring, or hoop may be seated in a groove and cannot possibly fall off. This is of especial value in the case of pails, barrels, or such articles which often fall to pieces owing to shrinking, which lets the retaining-band drop off. This feature of my invention is also evidently important in the case of tool-handles, such as the handles of chisels or similar instruments which require a retaining-band at the end which is to be struck by a hammer, in order that splitting of the wood of the handle may be prevented.

In the accompanying drawings, Figures 1, 2, 3, 4, 5, 7, and 8 illustrate various applications of my invention. Fig. 6 illustrates in plan a part of the devices that may be used for welding the band or ring.

Fig. 1 illustrates the application of the invention to a handle of a chisel, the end of which at E is provided with one or more bands or rings applied in a groove near the end. These bands or rings are of metal and are applied by lapping or bringing the ends of the rings together in abutment in the groove and the ring completed by welding such ends together, as will be presently described. The handle is by this means securely held against splitting and the retaining-ring is not liable to drop off.

Fig. 2 shows a pail having three grooves to which the bands are to be applied. The grooves are shown as having a depth of about half the thickness of the band. They might be, however, so deep that the band would be sunk beneath the surface of the pail or flush therewith, so that there would be no projections beyond the surface.

In Fig. 3 the bands or hoops are shown in place and welded.

The apparatus for welding may be of the construction indicated in Fig. 6. A and B are two curved pieces, preferably of metal, adapted to encircle the band and hold it in place upon the object during the welding operation. These two pieces are of metal, are jointed to one another or to a common connecting-piece at C D, and are preferably insulated from one another at that point. The pieces A B may carry the electrodes or contact devices, such as indicated at F G, which are simply two blocks of metal adapted to bear upon the ends of the band or ring E after the same is in place and at opposite sides of the point H, where the ends of the bands are brought together and abutted. The surfaces of the blocks F G that make contact with the band should be large. The blocks themselves may be connected by flexible conductors or otherwise with a source of electric energy adapted to supply currents of large volume for heating the metal of the band at H. This source of energy may be of any kind, as is well understood by those skilled in the art of electric welding. Preferably the two curved pieces A B are lined with insulating material to avoid electrical contact with the band excepting by the electrodes F G. By heating the metal of the band in place at the point H and forcing the two parts A B toward one another the metal will be pressed and welded. This device is merely an illustration of the devices that may be used, and the construction may be varied indefinitely. It might be anticipated that the welding in this manner would burn the wood or material of the article to which the band is applied; but the operation is so rapid and the heat so confined that burning occurs only at the burr, the part burned away making a kind of receptacle for the burr. If any slight scorching is visible, it may be prevented by directing a small stream of water onto the wood or material at the heated part of the metal band.

Fig. 4 illustrates the application of the invention to bobbins. Heretofore the practice has been to cut a small groove in the head of the bobbin and spring an open steel ring into the groove to strengthen the wood and keep it from splitting when the bobbin is placed upon the spindle to be wound. It is apparent that an open spring is of small value for such purposes and protects the wood but little. Instead of such a split ring, a finished band might be applied over the reduced end, after the manner employed with tool-handles; but such a retaining band or ring would be of little value and liable to drop off, for the reasons before explained. By my invention the ring may be welded into the groove and afford a positive resistance to any splitting strain.

Fig. 5 illustrates a barrel having its hoops welded in place on the barrel, the same as the pail illustrated in Figs. 2 and 3.

Fig. 7 illustrates the application of my invention to a retaining-band applied to a pipe-covering. Ordinarily a magnesium and asbestus covering is placed around the pipe, and the bands which hold it are lapped and bent to fasten them. By my invention the bands are welded after being put in place, the two sides being drawn tightly together by the grooved pieces A B, used in applying the welding-pressure.

Fig. 8 illustrates a reel with bands welded in grooves to act as tires when the reel is rolled about. In this case the burr may, if desired, be finished off or reduced on the top; but on the other articles the burr is not objectionable.

My invention is not limited to bands, rings, hoops, &c., upon wooden articles, but may be applied to articles made of other material.

What I claim as my invention is—

1. The herein-described method of applying a metal retaining band, ring, or hoop, consisting in welding the same after it is in place on the article or object, as and for the purpose described.

2. A pail, barrel, or other article, as described, having a metal retaining-band welded in place in a groove, as and for the purpose described.

3. The herein-described method of applying a metal retaining band or ring, consisting in bringing together the ends of the metal band or ring put in place upon the object, passing an electric current across the abutted ends, and then pressing the two sides of the band together so as to compress it around the object tightly and at the same time effect a welding.

Signed at Lynn, in the county of Essex and State of Massachusetts, this 19th day of February, A. D. 1891.

ELIHU THOMSON.

Witnesses:
JOHN W. GIBBONEY,
BENJAMIN B. HULL.